(12) United States Patent
Heim (10) Patent No.: US 12,379,721 B2
(45) Date of Patent: Aug. 5, 2025

(54) METHOD FOR CARRYING OUT A REMOTE-CONTROLLED PARKING MANEUVER WITH A VEHICLE USING A MOBILE TERMINAL, AND SYSTEM

(71) Applicant: Bayerische Motoren Werke Aktiengesellschaft, Munich (DE)

(72) Inventor: Eric Heim, Heidelberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 433 days.

(21) Appl. No.: 17/782,431

(22) PCT Filed: Nov. 4, 2020

(86) PCT No.: PCT/EP2020/080874
§ 371 (c)(1),
(2) Date: Dec. 1, 2022

(87) PCT Pub. No.: WO2021/110340
PCT Pub. Date: Jun. 10, 2021

(65) Prior Publication Data
US 2023/0128580 A1 Apr. 27, 2023

(30) Foreign Application Priority Data
Dec. 5, 2019 (DE) ...................... 10 2019 133 223.0

(51) Int. Cl.
*G05D 1/00* (2024.01)
*B60W 30/06* (2006.01)

(52) U.S. Cl.
CPC ........... *G05D 1/0038* (2013.01); *B60W 30/06* (2013.01); *B60W 2556/45* (2020.02)

(58) Field of Classification Search
CPC . B62D 1/00; B62D 15/0285; B60W 2556/45; B60W 30/06; G05D 1/0038; G08G 1/168
See application file for complete search history.

(56) References Cited

U.S. PATENT DOCUMENTS

| 2009/0248220 A1* | 10/2009 | Ecton | G08C 17/00 |
| | | | 701/2 |
| 2012/0029731 A1* | 2/2012 | Waldock | G08B 5/221 |
| | | | 701/2 |

(Continued)

FOREIGN PATENT DOCUMENTS

| CN | 104254475 A | 12/2014 |
| CN | 106935071 A | 7/2017 |

(Continued)

OTHER PUBLICATIONS

Chinese-language Office Action issued in Chinese Application No. 202080082657.0 dated Apr. 29, 2023 with English translation (15 pages).

(Continued)

*Primary Examiner* — Babar Sarwar
(74) *Attorney, Agent, or Firm* — Crowell & Moring LLP (57) ABSTRACT

A method carries out a remote-controlled parking maneuver with a vehicle. A user with a mobile terminal is located outside the vehicle. The method plans a trajectory for the parking maneuver by way of a driver assistance system of the vehicle, maneuvers the vehicle along the planned trajectory by the driver assistance system, detects image data which describes the vehicle and the surroundings of the vehicle by a camera of the mobile terminal, and provides a display on a display device of the mobile terminal using the image data. The maneuvering process along the planned trajectory is carried out as long as an operating input which is carried out by the user on the mobile terminal and which describes a movement of the vehicle during the maneuvering process along the planned trajectory is detected by way of the mobile terminal, otherwise the maneuvering process is interrupted.

9 Claims, 3 Drawing Sheets

(56) References Cited

U.S. PATENT DOCUMENTS

| | | |
|---|---|---|
| 2014/0058613 A1 | 2/2014 | Leinfelder |
| 2014/0213176 A1* | 7/2014 | Mendelson ............ G08C 17/02 |
| | | 455/39 |
| 2015/0045991 A1* | 2/2015 | Schwitters ............ B60W 30/06 |
| | | 701/2 |
| 2015/0088360 A1 | 3/2015 | Bonnet et al. |
| 2016/0358474 A1 | 12/2016 | Uppal |
| 2017/0021828 A1* | 1/2017 | Seo ....................... B60W 10/10 |
| 2017/0297624 A1* | 10/2017 | Noh ....................... G08G 1/143 |
| 2017/0361835 A1* | 12/2017 | Tarte ................... B62D 15/027 |
| 2018/0025640 A1* | 1/2018 | Micks ...................... G06N 3/08 |
| | | 340/932.2 |
| 2018/0107206 A1 | 4/2018 | Kuhnert et al. |
| 2018/0194324 A1* | 7/2018 | Neugebauer ........ H04L 63/0807 |
| 2018/0364697 A1 | 12/2018 | Elangovan et al. |
| 2019/0096261 A1* | 3/2019 | Hayashi ................. G08G 1/168 |
| 2019/0204821 A1* | 7/2019 | Yoon ..................... G05D 1/0223 |
| 2019/0258247 A1* | 8/2019 | Bando ..................... B62D 1/00 |
| 2019/0351900 A1* | 11/2019 | Matsuda ............. B62D 15/0285 |
| 2020/0005642 A1* | 1/2020 | Kim ........................ G08G 1/145 |
| 2020/0122707 A1* | 4/2020 | Jost ........................ B60W 20/50 |
| 2020/0134332 A1* | 4/2020 | Vossoughi ............. G08G 1/146 |
| 2020/0193827 A1* | 6/2020 | Refsdal ................. G08G 1/0133 |
| 2020/0241545 A1* | 7/2020 | Anthony ............... G05D 1/0088 |
| 2020/0384987 A1* | 12/2020 | Preissler ................ B60W 50/14 |
| 2021/0042540 A1* | 2/2021 | Shih ................... B62D 15/0285 |
| 2021/0356957 A1* | 11/2021 | Benda ................... G05D 1/0038 |
| 2024/0227860 A1* | 7/2024 | Govindhan ......... B60W 60/001 |

FOREIGN PATENT DOCUMENTS

| | | | | |
|---|---|---|---|---|
| CN | 109552316 A | * | 4/2019 | ............ B60W 30/06 |
| CN | 109814569 A | * | 5/2019 | ............ B60W 10/18 |
| CN | 109866760 A | | 6/2019 | |
| DE | 10 2012 016 868 A1 | | 2/2014 | |
| DE | 102014011613 A1 | * | 2/2016 | ............ B60W 30/06 |
| DE | 102016111878 A1 | * | 1/2018 | |
| DE | 10 2016 220 448 A1 | | 4/2018 | |
| DE | 102018114285 A1 | * | 12/2018 | ............ B60W 30/06 |
| DE | 10 2018 133 014 A1 | | 8/2019 | |
| DE | 112019000542 T5 | * | 10/2020 | ............ B60K 35/00 |
| EP | 2 295 281 A1 | | 3/2011 | |
| EP | 2 316 709 A2 | | 5/2011 | |
| EP | 3 101 593 A1 | | 12/2016 | |
| FR | 2908323 A1 | * | 5/2008 | ............ A63F 13/00 |
| JP | 2008015801 A | * | 1/2008 | |
| JP | 2012-40209 A | | 3/2012 | |
| JP | 2014-65392 A | | 4/2014 | |
| JP | 2014065392 A | * | 4/2014 | ........... B62D 15/027 |
| JP | 2014-196009 A | | 10/2014 | |
| JP | 2016-18413 A | | 2/2016 | |
| JP | 2019-119231 A | | 7/2019 | |
| JP | 2019-144756 A | | 8/2019 | |
| WO | WO 2013/041337 A1 | | 3/2013 | |
| WO | WO-2013037694 A1 | * | 3/2013 | ............... B62D 1/00 |
| WO | WO-2015106867 A1 | * | 7/2015 | ........... B62D 15/027 |
| WO | WO-2017093196 A1 | * | 6/2017 | ............ B60W 30/06 |

OTHER PUBLICATIONS

International Search Report (PCT/ISA/210) issued in PCT Application No. PCT/EP2020/080874 dated Jan. 29, 2021 with English translation (five (5) pages).

German-language Written Opinion (PCT/ISA/237) issued in PCT Application No. PCT/EP2020/080874 dated Jan. 29, 2021 (seven (7) pages).

German-language Search Report issued in German Application No. 10 2019 133 223.0 dated Apr. 29, 2020 with partial English translation (10 pages).

German-language Office Action issued in German Application No. 10 2019 133 223.0 dated Aug. 31, 2020 (three (3) pages).

Japanese-language Japanese Office Action issued in Japanese Application No. 2022-533104 dated Jul. 24, 2024, with English translation (7 pages).

* cited by examiner

METHOD FOR CARRYING OUT A REMOTE-CONTROLLED PARKING MANEUVER WITH A VEHICLE USING A MOBILE TERMINAL, AND SYSTEM

BACKGROUND AND SUMMARY

The present invention relates to a method for performing a remote-controlled parking maneuver with a vehicle, in which a user having a mobile device is situated outside the vehicle. The method comprises planning a trajectory for the parking maneuver and maneuvering the vehicle along the planned trajectory by means of a driver assistance system of the vehicle. Moreover, the method comprises capturing image data describing the vehicle and a surrounding area of the vehicle by means of a camera of the mobile device. In addition, the method comprises providing a display on a display device of the mobile device on the basis of the image data. Moreover, the present invention relates to a system for performing a remote-controlled parking maneuver with a vehicle.

Various driver assistance systems that support a user or driver when operating the vehicle are known from the prior art. Driver assistance systems or systems with which a remote-controlled parking maneuver, as it is known, can be performed are of interest here. In the event of such a parking maneuver, the vehicle can be maneuvered for example into a parking space by means of the driver assistance system. During the parking maneuver, the user or the driver of the vehicle is situated outside the vehicle. When this automated parking maneuver is performed, a corresponding operating action is performed by the user on a mobile device.

In this respect, it is known for example from the prior art that a corresponding button is pressed continuously on the mobile device. Moreover, it is known from the prior art that a smartphone is used as the mobile device and a corresponding operating input is effected on a touch-sensitive screen of the smartphone. For example, a circular swiping movement can be performed with a finger. As long as this operating input occurs, the automated parking maneuver is performed by means of the driver assistance system. If there is no operating input, the driving maneuver or parking maneuver is interrupted and the vehicle is braked. Using the mobile device and the corresponding operating action on the mobile device, a dead man's switch, as it were, is implemented, as a result of which the functional safety during the parking maneuver can be ensured. This operating action can be perceived as uncomfortable by a user who needs to perform such an operating action during the entire parking maneuver. This is the case in particular if the parking maneuver performed lasts longer than a predetermined time duration, for example 20 seconds.

For addressing this problem, systems in which a smartphone is used as the mobile device are known from the prior art. Using a camera of the smartphone, a temporal sequence of images can be captured, which describe the vehicle or the surrounding area of the vehicle. It is furthermore possible here to check whether the vehicle was sufficiently captured in the captured images. If for example the proportion of the image of the vehicle in entire image content lies above or below a specifiable threshold value, the autonomously controlled movement of the vehicle can be interrupted or terminated. Such a method is disclosed, for example, in DE 10 2012 016 868 A1.

Moreover, methods in which images that are recorded with mobile devices and smartphones are used to measure parking regions or corresponding spaces are known from the prior art. In this regard, EP 3 101 593 A1 describes a method for determining whether a vehicle fits into a space. The method comprises capturing an image of the space in which the vehicle is intended to move and simulating from the image a three-dimensional representation of the space. Moreover, the method comprises determining the dimensions of the space by using the three-dimensional representation and comparing the dimensions of the space with the dimensions of the vehicle.

It is an object of the present invention to specify a solution as to how a remote-controlled parking maneuver of the type mentioned in the introductory part can be performed more comfortably while maintaining the functional safety for the user.

This object is achieved according to the invention by a method and by a system having the features according to the independent claims. The dependent claims relate to advantageous developments of the present invention.

A method according to the invention serves for performing a remote-controlled parking maneuver with a vehicle, wherein a user having a mobile device is situated outside the vehicle. The method comprises planning a trajectory for the parking maneuver by means of a driver assistance system of the vehicle. Moreover, the method comprises maneuvering the vehicle along the planned trajectory by means of the driver assistance system. In addition, the method comprises capturing image data describing the vehicle and a surrounding area of the vehicle by means of a camera of the mobile device and providing a display on a display device of the mobile device on the basis of the image data. Provision is made here for the maneuvering to take place along the planned trajectory as long as an operating input, which is performed by the user on the mobile device and describes a movement of the vehicle during the maneuvering along the planned trajectory, is detected by means of the mobile device, and otherwise the maneuvering is interrupted.

A remote-controlled parking maneuver is to be performed with the aid of the method. This parking maneuver can be, for example, a maneuver for parking, in which the vehicle is maneuvered into a parking space. The parking maneuver can furthermore be an exit maneuver, in which the vehicle is maneuvered out of a parking space. The vehicle is maneuvered automatically or autonomously by means of the driver assistance system during the parking maneuver. That means that the driver assistance system can intervene in the longitudinal control and lateral control of the vehicle. The trajectory for the parking maneuver is planned by means of the driver assistance system. For this purpose, for example sensor data describing the surrounding area of the vehicle can be provided with one or more vicinity sensors. In particular, objects or obstacles and the positions thereof in the surrounding area of the vehicle can be recognized by means of the driver assistance system based on the sensor data. Based on the recognized objects and the known dimensions of the vehicle, a trajectory for the parking maneuver can then be planned.

During the parking maneuver, the user or driver of the vehicle is situated outside the vehicle. The user can hold the mobile device with one or both hands during the parking maneuver. The mobile device is in particular a smartphone, a tablet computer, or the like. The mobile device comprises a camera, by means of which image data or a sequence of images describing the surrounding area of the vehicle and the vehicle can be recorded. Moreover, the mobile device comprises a display device or a display unit, on which a corresponding display can be provided. For example, the image data that are recorded by the camera of the mobile device can be continuously displayed on the display device. It is possible here in a known manner to check whether the vehicle is situated within the capture region of the camera of the mobile device during the parking maneuver. It is thus possible to check whether predetermined regions of the vehicle are captured with the camera of the mobile device and/or are displayed on the display device. If this is not the case, the parking maneuver can be terminated. For this purpose, known methods of image processing or object recognition can be used, in which the vehicle is recognized in the image data.

Provision is moreover made for a predetermined operating input to be performed by the user on the mobile device or using the mobile device during the automated or autonomous parking maneuver. If this operating input does not take place, the parking maneuver can be interrupted and the vehicle be braked. Provision is here made according to the present invention for the operating input made by the user to describe the movement of the vehicle during the maneuvering along the planned trajectory. It is thus necessary during the parking maneuver that the predetermined operating input is performed by the user. This operating input can be specified individually for the planned parking maneuver. The operating input performed can describe the movement of the vehicle during the autonomously performed parking maneuver. In particular, a movement along the planned trajectory or along an image of the actually performed trajectory on the mobile device will be performed by the user during the operating input. As it were, the movement of the vehicle during the performance of the parking maneuver can be reproduced or simulated by the user during the operating input.

If the operating input by the user deviates from this predetermined operating input, maneuvering of the vehicle or performing the remote-controlled parking maneuver can be interrupted. While the operating action is performed, the user is given the impression, as it were, that they can actively control the vehicle during the parking maneuver by means of the mobile device. In this way, it can be ensured that the user monitors the movement of the vehicle and the surrounding area of the vehicle during the entire parking maneuver. It is thus possible to ensure that the user directs their attention to the parking maneuver. In addition, the advantage arises that the operating input is not perceived as uncomfortable by the user in comparison with known methods in which for example a button is pressed or a movement that is independent of the parking maneuver is performed continuously on the mobile device. It is thus possible during the remote-controlled parking maneuver to ensure the functional safety and to provide the function of a dead man's switch.

During the operating input, data describing the operating input can be transmitted continuously from the mobile device to the driver assistance system. Alternatively or additionally, data describing the position of the vehicle on the planned trajectory can be transmitted to the mobile device using the driver assistance system. It is thus possible to check whether the operating input describes the movement of the vehicle or whether the operating input reproduces the movement of the vehicle.

Preferably, a trajectory symbol describing the planned trajectory is superposed on the display of the mobile device. As already explained, the display can be provided on the basis of the image data which are recorded with the camera of the mobile device. This display can thus—as is known for recording a photo with a smartphone—display the surrounding area and the vehicle. In addition, the trajectory symbol can be superposed onto this display. The trajectory symbol can thus overlay the displayed image data. The trajectory symbol can have the shape of a curved line and describe the trajectory that is followed by the vehicle during the autonomous parking maneuver. Furthermore, the trajectory symbol can have a corresponding arrow describing the direction of travel of the vehicle during the parking maneuver. The trajectory symbol can be determined by means of the mobile device or a computing device of the mobile device. Provision can here be made for corresponding data describing the planned trajectory to be transmitted from the driver assistance system to the mobile device. Taking into account the two-dimensional representation of the surrounding area and of the vehicle on the display device, it is then possible to superpose the trajectory symbol by means of the computing device of the mobile device. The trajectory symbol specifies, as it were, to the user how they need to perform the operating input. It is thus possible to ensure that the user perform the required operating input during the remote-controlled parking maneuver.

According to an embodiment, maneuvering is performed for as long as a swiping movement caused by at least one finger of the user is detected as the operating input by means of a capture device of the mobile device, wherein the swiping movement describes the movement of the vehicle along the planned trajectory. By means of the capture device of the mobile device, it is thus possible to capture a swiping movement as the operating input. With this swiping movement, the user can glide at least one finger along the capture device. The capture device can in particular be a part of a touch-sensitive screen of the mobile device or of the smartphone, wherein the touch-sensitive screen simultaneously comprises the display device of the mobile device. In comparison with swiping movements known from the prior art, such a swiping movement has the advantage that it describes the parking maneuver and gives the user the impression of actively controlling the vehicle.

As described previously, the trajectory symbol can be superposed on this display device of the mobile device or the trajectory symbol can be overlaid on the image data represented. Provision is made here in particular for the swiping movement to be performed along the trajectory symbol. In other words, during the operating input or the swiping movement, the displayed or superposed trajectory symbol can be traced with the finger, as it were. Provision can here furthermore be made for a position symbol to be superposed in addition to the trajectory symbol. This position symbol can describe the current position of the vehicle on the trajectory. During the autonomous parking maneuver, the position of the position symbol along the trajectory can change. Data describing the current position of the vehicle in relation to the trajectory can be transmitted from the driver assistance system to the mobile device. On the basis of the data, the position symbol can then be determined by means of the mobile device and superposed. The position symbol specifies, as it were, for the user for the operating input where they should position their finger. Alternatively, provision may be made that this position symbol can be shifted by the operating input of the user or by the swiping movement along the trajectory symbol. The operating input is thus specified for the user in a simple, intuitive manner. In addition, it is possible in a simple manner to check whether the operating input is made according to the specifications. If the swiping movement deviates from the trajectory symbol displayed or from the position symbol displayed, the parking maneuver can be terminated.

If the swiping movement deviates significantly from the superposed trajectory symbol, the autonomous parking maneuver can be interrupted. If the user performs for example with at least one finger a random swiping movement on the capture device, the parking maneuver can be interrupted. The parking maneuver can likewise be interrupted if the user takes at least one finger off the capture device or the touch-sensitive screen. If the parking maneuver is interrupted, the user can be informed of this by way of a corresponding message. The parking maneuver or driving maneuver can then be continued when the user performs or continues the operating input.

According to an alternative embodiment, the maneuvering is performed for as long as a movement of the mobile device is detected as the operating input, wherein the movement of the mobile device describes the movement of the vehicle along the planned trajectory. Another variant for performing the operating input is to move the entire mobile device or the entire smartphone. It is thus possible during the performance of the autonomous parking maneuver to move the entire mobile device, which is directed by the user in the direction of the vehicle, wherein the movement of the vehicle during the parking maneuver is simulated by the operating input performed in the process. Here, too, provision can be made for a check to be performed continuously as to whether a predetermined portion of the vehicle is captured by the camera of the mobile device during this operating input. If this is not the case, the parking maneuver can be terminated. In this way, the user is given the impression, as it were, that they can control the vehicle by the movement of the mobile device. In this way, too, the functional safety can be ensured during the parking maneuver. The movement of the mobile device or of the smartphone can be continuously determined with at least one motion sensor of the mobile device. Using the at least one motion sensor, a movement, an acceleration, and/or an inclination can be ascertained. Known smartphones or tablet computers typically comprise such motion sensors. It is therefore not necessary that these mobile devices are modified for the method to be carried out.

Provision is made here, in particular, for a vehicle symbol describing an outer contour of the vehicle to be superposed on the display of the mobile device, wherein the maneuver is performed for as long as the vehicle symbol is substantially overlaid with an image of the vehicle in the display. The vehicle symbol can describe the outer contour of the vehicle in relation to the display provided. In other words, the vehicle symbol can describe the outer contour of the vehicle in the image data. The position of the vehicle symbol in the display can be determined in dependence on the current position of the vehicle during the parking maneuver. It is possible to check during the performance of the parking maneuver whether the mobile device is held or moved by the user in a manner such that the vehicle symbol is substantially overlaid with the image of the vehicle on the display or if the image of the vehicle or a predetermined proportion thereof is situated within the vehicle symbol. If a predetermined deviation between the vehicle symbol and the image of the vehicle on the display is detected, the parking maneuver can be interrupted.

The parking maneuver can be continued when the vehicle symbol is overlaid with the image of the vehicle in the display. In this case, it is necessary for the user to move the mobile device such that the vehicle symbol again coincides with the image of the vehicle. The vehicle symbol can thus be "locked on to" the image of the vehicle. If it is recognized that the vehicle symbol and the image of the vehicle coincide, a corresponding feedback message can be output by means of the mobile device. This feedback message can be of a visual, acoustic, and/or haptic nature. Such a procedure can also be provided to initially start the parking maneuver. In order to start the automated parking maneuver, the user can align the mobile device such that the vehicle symbol and the image of the vehicle coincide on the display device.

It is furthermore advantageous if a feedback message that assesses the performance of the operating input is output to the user by means of the mobile device. As already explained, the user can be correspondingly informed if the parking maneuver is interrupted. For this purpose, a corresponding feedback message can be output to the user by means of the mobile device. This feedback message can be output visually, for example using a corresponding indication on the display, acoustically, for example by the output of a corresponding tone or a signal, and/or haptically, for example by way of a corresponding vibration alarm or the like. Provision can also be made for corresponding indications to be output for the user during the performance of the operating input. These indications can include, for example, information as to how the operating input should be performed. These indications can include in particular indications relating to a direction or a speed with which the operating input is performed. Moreover, provision can be made for the feedback message to indicate to the user how well the operating input performed matches the specified operating input. For example, a color display can be used herefor. The user can hereby be supported when performing the operating input.

It is furthermore advantageous if the parking maneuver is performed for as long as the operating input is performed with a predetermined operating speed, and otherwise the parking maneuver is terminated. The operating speed with which the operating input is performed is in particular dependent on the current speed of the vehicle during the performance of the parking maneuver. The operating input should thus be performed in particular such that it describes the speed of the vehicle during the parking maneuver. The user is thus given the impression that they control the movement of the vehicle during the parking maneuver when the operating input is performed correctly. Here, too, provision may be made for corresponding indications or feedback messages that specify the operating speed or assess the operating speed of the operating input to be output to the user. The user can thereby be supported when performing the operating input.

In a further embodiment, at least one parking region is detected as the target for the parking maneuver before the trajectory is planned on the basis of the image data by means of the mobile device and the at least one parking region is offered to the user for selection. If the user is situated outside the vehicle, they can align the mobile device or the smartphone in the direction of a desired parking region. The parking region can in particular be a parking space. Using the camera of the mobile device, it is then possible to provide the image data describing the parking region. On the basis of the image data, the parking region or the parking space can then be measured by means of the mobile device. For this purpose, methods known from image processing or object recognition can be used, for example "structure from motion" or the like. After the parking region or parking space has been measured, it is then possible to check by means of the mobile device and on the basis of the known dimensions of the vehicle whether the parking region is suitable for the vehicle. If the parking region offers sufficient dimensions for parking the vehicle, this can be displayed accordingly to the user on the display of the mobile device. For example, a corresponding superposition can appear, in which the parking area is marked in green. If the dimensions of the parking area are not sufficient for the vehicle, this can be marked on the display in red by means of a corresponding superposition.

Furthermore, the user can be given the option of selecting the parking area that has been recognized as being suitable for parking the vehicle. Subsequently, corresponding information describing the selected parking area and/or the dimensions of the selected parking area can be transmitted from the mobile device to the vehicle or to the driver assistance system. For this purpose, provision is made in particular for the relative location between the vehicle and the mobile device to be determined. To determine the relative location between the mobile device and the vehicle, data can be correspondingly exchanged, for example. Based on the runtime of the data that are exchanged at different times, it is then possible to ascertain the relative location between the vehicle and the mobile device by means of triangulation. Alternatively or in addition, satellite-assisted position determination systems, such as GPS, can be used to determine the position of the vehicle and/or the position of the mobile device. It is thus, for example, not necessary for the desired parking area or parking space to be recognized by the vicinity sensors of the vehicle as a target for the parking maneuver and/or measured in advance. It is likewise not necessary for the vehicle to be positioned corresponding to the parking area. The functionality of the remote-controlled parking maneuver can thus be extended.

According to a further embodiment, a position of at least one parking region that is recognized as a target for the parking maneuver on the basis of measurements with at least one vicinity sensor of the driver assistance system is displayed on the display device of the mobile device. Corresponding parking areas or parking spaces can be measured with the vicinity sensors of the driver assistance system and be recognized as possible targets for the parking maneuver. Here, corresponding data or information describing the recognized parking areas can be transmitted from the driver assistance system to the mobile device. On the basis of these data, corresponding display or superposition on the display can then be provided, with which the recognized parking regions are displayed for the user. If the recognized parking area lies outside the display region on the display of the mobile device, corresponding messages can be output to the user as to the location in the surrounding area at which these recognized parking areas are located or in which direction the user should move the mobile device. Hereby, too, the functionality of the remote-controlled parking maneuver can be additionally extended.

A system according to the invention serves for performing a remote-controlled parking maneuver with a vehicle, in which a user having a mobile device is situated outside the vehicle. The system comprises a driver assistance system of the vehicle for planning a trajectory for the parking maneuver and for maneuvering the vehicle along the planned trajectory. Moreover, the system comprises the mobile device having a camera for capturing image data describing the vehicle and the surrounding area of the vehicle, and having a display device for providing a display on the basis of the image data. The mobile device is here configured to detect an operating input, which is performed by the user on the mobile device and describes a movement of the vehicle during the maneuvering along the planned trajectory. Moreover, the driver assistance system is configured to perform the maneuvering along the planned trajectory for as long as the mobile device detects the operating input, and otherwise to interrupt the maneuvering.

The driver assistance system can have at least one vicinity sensor by means of which the surrounding area of the vehicle can be captured. In particular, sensor data describing the surrounding area and objects in the surrounding area can be provided with the at least one vicinity sensor. The at least one vicinity sensor can be present in the form of a radar sensor, lidar sensor, ultrasonic sensor, and/or a camera. Moreover, the driver assistance system can have a control device by means of which the sensor data can be evaluated. In addition, control signals can be output with the control device in order to maneuver the vehicle in automated or autonomous fashion. The longitudinal control and lateral control of the vehicle can thus be assumed. In addition, a trajectory for the parking maneuver can be calculated with the control device on the basis of the captured objects in the surrounding area. In addition, the driver assistance system can have a communication unit for wirelessly transmitting and/or receiving data.

The mobile device can in particular be designed in the form of a smartphone or tablet. The mobile device can have a display device for providing a display and a capture device for capturing an operating action. Moreover, the mobile device comprises a camera, by means of which image data of the vehicle and of the surrounding area of the vehicle can be provided. The mobile device furthermore can have at least one motion sensor, by means of which the movement of the mobile device can be captured. The mobile device can also have a communication device so as to be able to wirelessly exchange data with the communication device of the driver assistance system. The mobile device furthermore comprises a computing device, which is connected for data transmission to the camera, the display device, the capture device, and the communication device. The computing device can be formed by a processor of the mobile device or of the smartphone.

To perform the method or for operating the system, the relative location between the mobile device and the vehicle can be determined. To this end, data can be wirelessly exchanged at different times by the communication devices and/or GPS data can be used. The location of the mobile device in relation to the vehicle can be determined by means of triangulation. Data of the at least one motion sensor of the mobile device can furthermore be used. Provision can also be made for methods of image processing which are based on neural networks to be used for localizing the vehicle in relation to the mobile device. Provision can also be made for the mobile device to have a stereo camera and for the relative location to be determined on the basis of the image data of the stereo camera.

In order to determine the position of the vehicle in the different images or image data, the optical flow technique can be used. In this way, the vehicle can be tracked in the moved images. As soon as the camera position or the position of the mobile device in relation to the vehicle has been determined, the previously described trajectory symbol and/or the vehicle symbol can be determined and superposed. Only the field of view of the camera is required here, which can be determined for example on the basis of the pinhole camera model. The field of view can be calculated on the basis of the resolution, the pixel size, and the focal length of the camera. With the field of view known, merely algebraic transformations, for example rotations and translations, are required to display the symbols or superpositions in the correct size and at the correct position. In order to check the operating input in the form of the movement of the mobile device, data of the motion sensor and the optical flow technique can be used. The processors of typical smartphones have a corresponding computation power for performing the previously described steps of the method.

A further aspect of the invention relates to computer programs, comprising commands that, when the programs are executed by a computing device of the mobile device and by a control device of the driver assistance system, cause the latter to perform a method according to the invention and the advantageous configurations thereof. The invention furthermore relates to computer-readable (storage) media, comprising commands that, when being executed by a computing device of the mobile device and by a control device of the driver assistance system, cause the latter to perform a method according to the invention and the advantageous configurations thereof.

The preferred embodiments mentioned above with respect to the method according to the invention and the advantages thereof accordingly apply to the system according to the invention, to the computer programs according to the invention, and to the computer-readable (storage) media according to the invention.

Further features of the invention are evident from the claims, the figures, and the description of the figures. The features and combinations of features mentioned in the description above and also the features and combinations of features that are mentioned in the description of the figures below and/or shown in the figures alone are utilizable not only in the respectively stated combination but also in other combinations or alone, without departing from the scope of the invention.

The invention will now be explained in more detail on the basis of preferred exemplary embodiments and with reference to the attached drawings.

BRIEF DESCRIPTION OF THE DRAWINGS

Identical or functionally identical elements are provided with the same reference signs in the figures.

DETAILED DESCRIPTION OF THE DRAWINGS

Figure 1:
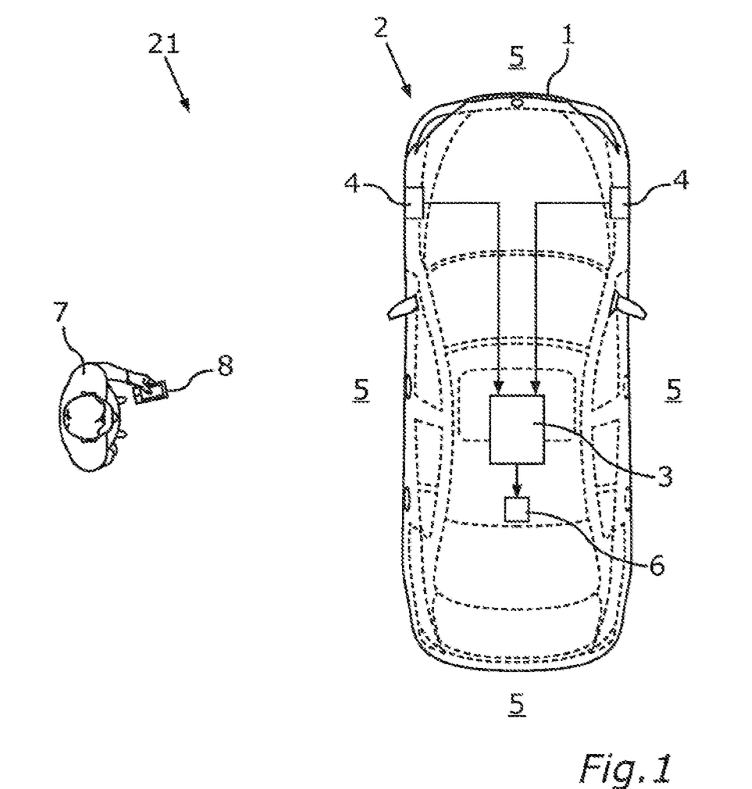
FIG. 1 is a schematic illustration of a vehicle having a driver assistance system and of a user holding a mobile device in the surrounding area of the vehicle.

FIG. 1 shows a schematic illustration of a vehicle 1, which in the present case is a passenger car, in a plan view. The vehicle 1 comprises a driver assistance system 2, which in turn comprises an electronic control device 3. The driver assistance system 2 furthermore comprises at least one vicinity sensor 4, by means of which a surrounding area 5 of the vehicle 1 can be captured. In the present exemplary embodiment, the driver assistance system 2 comprises two vicinity sensors 4, which can be present in the form of radar sensors, for example. The driver assistance system 2 moreover comprises a communication device 6, with which data can be wirelessly transmitted and received.

Sensor data describing the surrounding area 5 of the vehicle 1 can be provided with the vicinity sensors 4. These sensor data can be transmitted from the vicinity sensors 4 to the control device 3. Furthermore, a trajectory for a parking maneuver can be planned by means of the driver assistance system 2. In the case of this parking maneuver, the vehicle 1 can be parked for example in a parking space or can exit a parking space. The driver assistance system 2 can additionally have further vicinity sensors 4, for example a plurality of ultrasonic sensors, with which objects or obstacles in the surrounding area 5 of the vehicle 1 can be captured during the performance of the parking maneuver. Corresponding control signals can be transmitted by means of the control device 3 to a steering system, a drive motor, and/or a brake system of the vehicle 1 in order to maneuver the vehicle 1 automatically or at least partially autonomously during the parking maneuver.

A user 7 holding a mobile device 8 is situated in the surrounding area 5 of the vehicle 1. This mobile device 8, which can in particular be a smartphone or a tablet computer, is illustrated schematically in FIG. 2. The mobile device 8 and the driver assistance system 2 together form a system 21. The mobile device 8 comprises a camera 9, with which images or image data of the surrounding area 5 and of the vehicle 1 can be provided. The mobile device 8 furthermore comprises a display device 10, by means of which a display can be provided. This display can be provided on the basis of the image data that are recorded with the camera 9. In addition, the mobile device 8 comprises a capture device 11, with which an operating input on the display device 10 can be captured. In the present example, the display device 10 and the capture device 11 are formed by a touch-sensitive screen.

Figure 2:
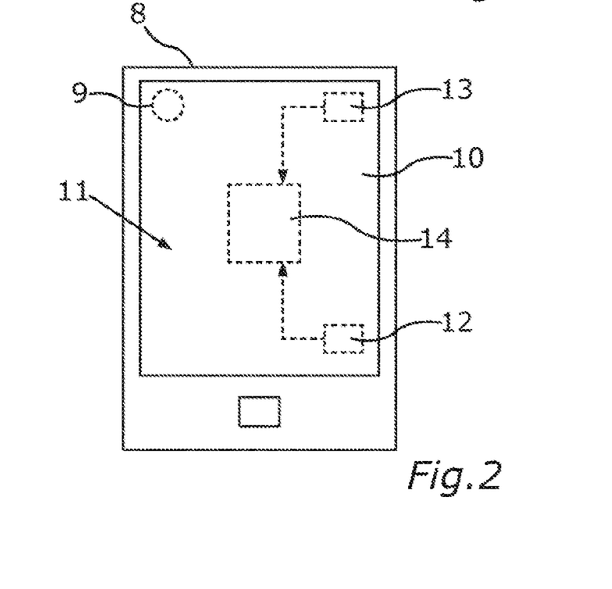
FIG. 2 is a schematic illustration of a mobile device and of the individual components of the mobile device.

In addition, the mobile device 8 comprises a motion sensor 12, with which a movement of the mobile device 8 can be captured. A rotation, an inclination, an acceleration or the like of the mobile device 8 can be captured with the motion sensor 12. An operating input in the form of a movement of the entire mobile device 8 can be captured by means of the motion sensor 12. The mobile device 8 furthermore comprises a communication device 13, which serves to wirelessly exchange data with the communication device 6 of the driver assistance system 2. Finally, the mobile device 8 comprises a computing device 14, which is connected to the camera 9, the display device 10, the capture device 11, the motion sensor 12, and the communication device 13 for exchanging data.

In order to be able to determine the relative location between the mobile device 8 and the vehicle 1, corresponding data can be exchanged at different times between the communication device 13 of the mobile device 8 and the communication device 6 of the driver assistance system 2. Provision can also be made for corresponding GPS receivers of the vehicle 1 and of the mobile device 8 to be used for determining the respective position or the relative location with respect to one another. Furthermore, the position of the vehicle 1 in relation to the mobile device 8 can be determined on the basis of the image data and corresponding image processing.

Figure 3:
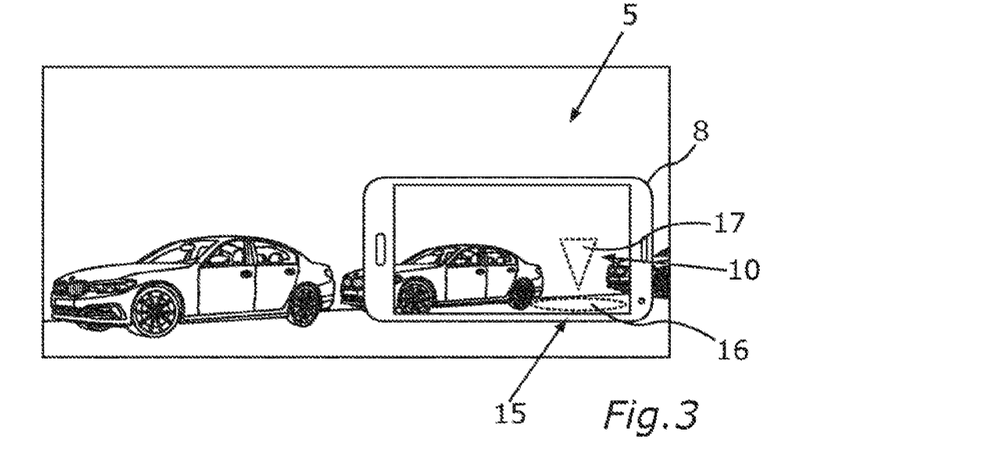
FIG. 3 shows a parking region in the surrounding area of the vehicle, which is recorded with a camera of the mobile device.

FIG. 3 shows the surrounding area 5 of the vehicle 1 and the mobile device 8, on whose display device 10 parts of the surrounding area 5 are displayed. In the present case, the mobile device 8 or the smartphone is used to search for a suitable parking area 15 for the vehicle 1. In the present case, the user 7 is situated in the surrounding area 5 of the vehicle 1 and positions the mobile device in a manner such that the possible parking area 15 lies in the capture region or field of view of the camera 9. Using corresponding methods of image processing, the parking space or the parking area 15 can be measured and it is possible to check by means of the computing device 14 of the mobile device whether the dimensions of the parking area 15 are sufficient to park the vehicle 1 in the parking area 15.

If the dimensions of the parking area 15 are sufficient for parking the vehicle 1, this can be correspondingly displayed to the user. In the present example, a symbol 16 that indicates that the selected parking area 15 is suitable for the vehicle 1 is superposed for the user. Provision can furthermore be made here for this symbol 16 to be displayed in a corresponding color, for example in a green color. If the preselected parking area 15 is not sufficient in terms of the dimensions for parking the vehicle 1 on the parking area 15, a corresponding symbol 16 can be displayed in a red color. Moreover, a further symbol 17 is superposed on the display device 10 of the mobile device 8 for the user, giving them the option of selecting this parking space or the parking area 15. If the user 7 has selected the parking area 15, corresponding data can be transmitted from the mobile device 8 to the driver assistance system 2. These data can describe the position and the dimensions of the parking area 15. Subsequently, a trajectory for the driving maneuver or parking maneuver to the parking area 15 can be ascertained by means of the driver assistance system 2.

Figure 4:
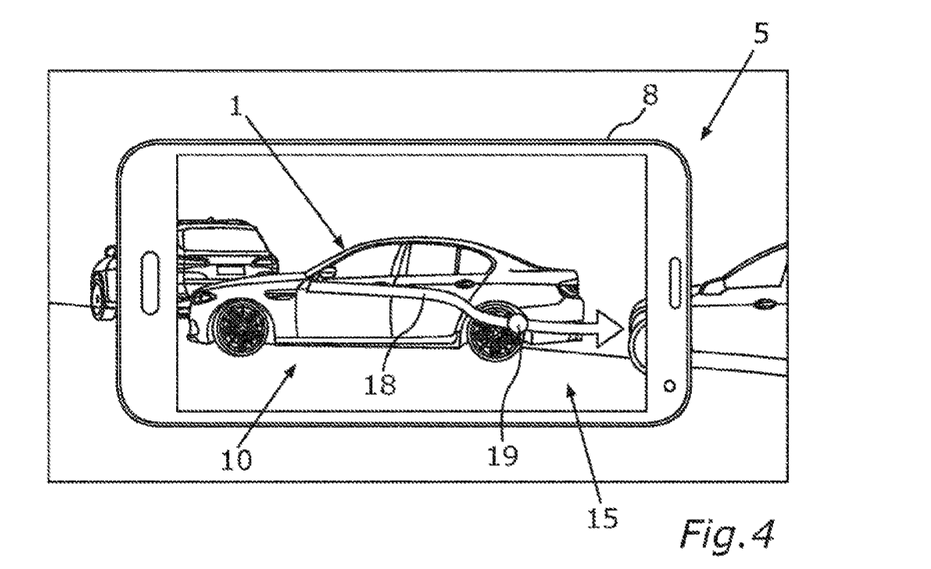
FIG. 4 shows a mobile device on which a trajectory symbol is displayed during the performance of an automated parking maneuver with the vehicle.

FIG. 4 shows the surrounding area 5 of the vehicle 1 and the mobile device 8, on which furthermore parts of the surrounding area 5 and of the vehicle 1 are displayed. In the present case, the parking maneuver is currently being performed by means of the driver assistance system 2. Here, the vehicle 1 is maneuvered in reverse into a parallel parking space at least partially autonomously. The parking maneuver can here be performed for as long as at least a predetermined part of the vehicle 1 is situated in the capture region of the camera 9 or is displayed on the display device 10. If not, the parking maneuver can be interrupted. Provision is additionally made for the parking maneuver to be performed for as long as a predetermined operating input is performed by the user 7 on the mobile device 8. The operating input is here configured such that it describes or reproduces the movement of the vehicle 1 during the parking maneuver.

In the present example, a trajectory symbol 18 is additionally superposed on the display device 10 during the parking maneuver. This trajectory symbol 18 describes the progression or the movement of the vehicle 1 during the parking maneuver. Provision is made here for the user 7 to perform with at least one finger a swiping movement as the operating input on the capture device 11 or on the touch-sensitive screen during the parking maneuver, wherein the swiping movement is performed along the trajectory symbol 18. In other words, the user 7 traces the trajectory symbol 18 on the display device 10 with a finger during the operating input. In the present example, additionally a position symbol 19 is superposed, which can describe the current position of the vehicle 1 on the trajectory.

Figure 5:
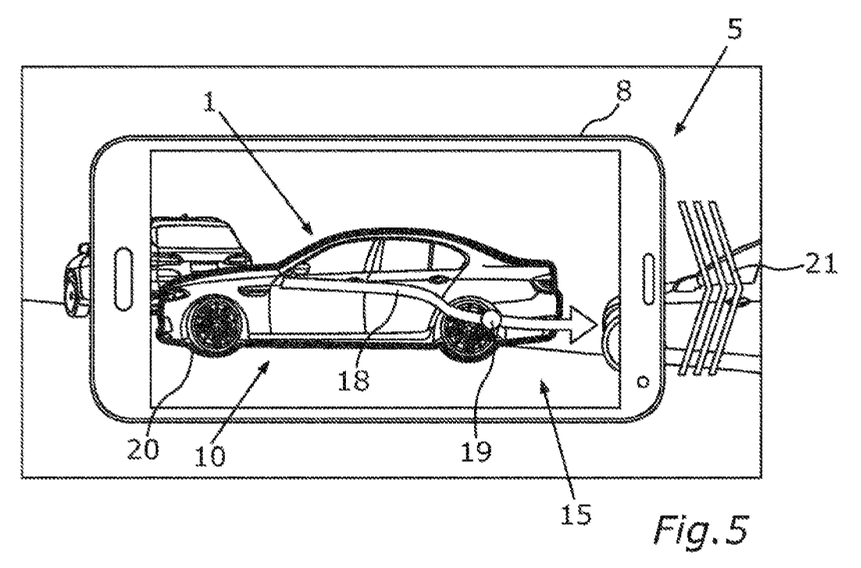
FIG. 5 shows a display of the mobile device on which a vehicle symbol is displayed during the performance of the autonomous parking maneuver with the vehicle.

FIG. 5 shows the surrounding area 5 of the vehicle 1 and the mobile device, which displays parts of the surrounding area 5 and of the vehicle 1, during a parking maneuver according to a further embodiment. Here, too, the vehicle 1 is maneuvered in reverse into a parallel parking space at least partially autonomously. In this example, the trajectory symbol 18 and the position symbol 19 are also superposed. In this case, a vehicle symbol 20 describing an outer contour of the vehicle 1 or the image of the vehicle 1 on the display device 10 is additionally superposed. Here, the parking maneuver can be started by means of the driver assistance system 2 as soon as the vehicle symbol 20 coincides with the image of the vehicle 1 on the display device 10. As the vehicle 1 maneuvers, the entire mobile device 8 is moved in the present case as the operating input. The movement during this operating input follows the planned trajectory. The movement of the mobile device 8 is here illustrated by way of the arrow symbol 21. A corresponding arrow symbol 21 can also be displayed for the user on the display device 10. The movement of the mobile device 8 can be determined continuously with the aid of the position sensor 12.

Figure 6:
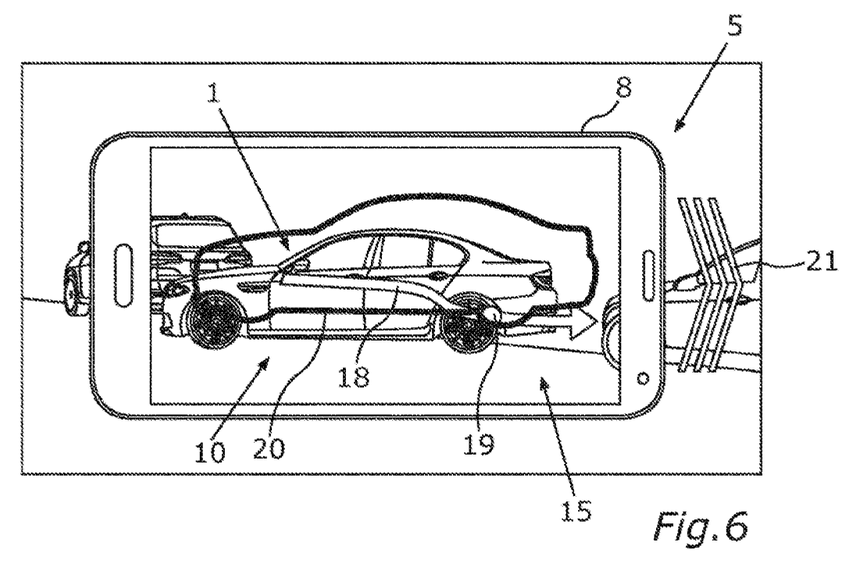
FIG. 6 shows the display on the mobile device according to FIG. 5 in accordance with a further embodiment.

In the present example it is necessary for the user to move the mobile device 8 such that the vehicle symbol 20 coincides with the image of the vehicle 1. If there is a predetermined deviation between the vehicle symbol 20 and the image of the vehicle 1, the parking maneuver is interrupted and the vehicle 1 is braked. This is illustrated in the present case in FIG. 6. Here, the vehicle symbol 20 has a significant deviation from the image of the vehicle 1 on the display device 10. In this case, the parking maneuver can be continued when the vehicle symbol 20 is made to coincide with the image of the vehicle 1.

The invention claimed is:

1. A method for performing a remote-controlled parking maneuver with a vehicle, wherein a user having a mobile device is situated outside the vehicle, the method comprising:

displaying on a display of the mobile device; a trajectory symbol depicting a movement path of the vehicle in executing the parking maneuver, and a position symbol superimposed on the trajectory symbol and depicting a current position of the vehicle along the movement path, wherein the trajectory symbol and the position symbol are displayed as an overlay to a real-time camera image of: the vehicle and a vehicle environment, as captured by a camera of the mobile device; and automatically maneuvering the vehicle so as to execute the parking maneuver only as long as an operating input is detected by the mobile device, wherein the operating input corresponds to the user tracking the displayed position symbol along the displayed trajectory symbol during and in accordance with the parking maneuver being executed by the vehicle.

2. The method of claim 1, wherein the operating input comprises a swiping movement on the display of the mobile device along the displayed trajectory.

3. The method of claim 1, wherein the operating input comprises a movement of the mobile device so as to visually track the displayed trajectory on the display.

4. The method of claim 3, wherein a vehicle symbol representing an outer contour of the vehicle is superposed on the display, and wherein the visual tracking comprises maintaining the vehicle symbol overlaid on the display with the image of the vehicle.

5. The method of claim 1, further comprising:
outputting a feedback message assessing the performance of the operating input to the user via the mobile device.

6. The method of claim 1, wherein the operating input comprises tracking the displayed trajectory at a predetermined operating speed.

7. The method of claim 1, further comprising:
identifying at least one parking region for the parking maneuver, and
offering the at least one parking region to the user for selection via the mobile device.

8. The method of claim 7, further comprising:
displaying, on the display, a position of the at least one parking region based on measurements with at least one vicinity sensor of a driver assistance system.

9. A system for performing a remote-controlled parking maneuver with a vehicle having a driver assistance system, wherein a user having a mobile device is situated outside the vehicle, the system comprising:
the driver assistance system configured to autonomously execute the parking maneuver only as long as an operating input is detected by the mobile device; and
the mobile device having a camera and a display, wherein the mobile device is configured to:
display: a trajectory symbol depicting a movement path of the vehicle in executing the parking maneuver, and a position symbol superimposed on the trajectory symbol and depicting a current position of the vehicle along the movement path, wherein the trajectory symbol and the position symbol are displayed as an overlay to a real-time camera image of the vehicle and a vehicle environment captured by the camera, and
detect the operating input corresponding to the user tracking the displayed position symbol along the displayed trajectory symbol during and in accordance with the parking maneuver being executed by the vehicle.

* * * * *